United States Patent
Bourdeu et al.

(10) Patent No.: US 12,228,651 B2
(45) Date of Patent: Feb. 18, 2025

(54) METHOD FOR PROCESSING DATA PROVIDED BY A LIDAR AND ASSOCIATED COMPUTER

(71) Applicant: CONTINENTAL AUTONOMOUS MOBILITY GERMANY GMBH, Ingolstadt (DE)

(72) Inventors: Alexandre Bourdeu, Toulouse (FR); Boris Lugez, Toulouse (FR); Thibault Caron, Toulouse (FR)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 323 days.

(21) Appl. No.: 17/786,974

(22) PCT Filed: Jan. 20, 2021

(86) PCT No.: PCT/EP2021/051221
§ 371 (c)(1),
(2) Date: Jun. 17, 2022

(87) PCT Pub. No.: WO2021/148481
PCT Pub. Date: Jul. 29, 2021

(65) Prior Publication Data
US 2023/0041817 A1 Feb. 9, 2023

(30) Foreign Application Priority Data
Jan. 21, 2020 (FR) ...................................... 2000561

(51) Int. Cl.
*G01S 17/931* (2020.01)
*G01S 7/4865* (2020.01)

(52) U.S. Cl.
CPC .......... *G01S 17/931* (2020.01); *G01S 7/4865* (2013.01)

(58) Field of Classification Search
CPC ..................................................... G01S 17/931
See application file for complete search history.

(56) References Cited

U.S. PATENT DOCUMENTS

| 2017/0322309 A1 | 11/2017 | Godbaz et al. |
| 2019/0369212 A1* | 12/2019 | Dylewski ................ G01S 17/93 |

(Continued)

FOREIGN PATENT DOCUMENTS

| FR | 3106423 A1 | 7/2021 |
| WO | 2021148481 A1 | 7/2021 |

OTHER PUBLICATIONS

Canadian Examination Report for Canadian Application No. 3,166,839, dated Aug. 9, 2023, 3 pages.

(Continued)

*Primary Examiner* — Hyun D Park
(74) *Attorney, Agent, or Firm* — Buchanan, Ingersoll & Rooney PC

(57) ABSTRACT

A method for processing data provided by a lidar. Obtaining, for measurement points of a lidar, data representative of a diffuse intensity and a distance between the measurement point and the lidar; determining an angle of incidence of the lidar at each measurement point; calculating, for each measurement point, reflectivity from the angle of incidence, the distance and the diffuse intensity; identifying spatially adjacent measurement points having a reflectivity within a given range of values to form common reflectivity zones; defining a cost function for at least one common reflectivity zone, the cost function including a first diffuse intensity and a second diffuse intensity, the angle and the distance of the measurement point in question; minimizing the cost function in order to update at least one of the angle, the distance and the reflectivity at the measurement point, for each of the measurement points belonging to a common reflectivity zone.

15 Claims, 2 Drawing Sheets

(56) References Cited

U.S. PATENT DOCUMENTS

2020/0103920 A1* 4/2020 Castorena Martinez .................... G06T 7/74
2023/0041817 A1 2/2023 Bourdeu et al.

OTHER PUBLICATIONS

English Translation of the Written Opinion for International Application No. PCT/EP2021/051221, mailed Mar. 31, 2021, 7 pages.
Jayaraman, A., et al., "Creating 3D Virtual Driving Environments for Simulation-Aided Development of Autonomous Driving and Active Safety", Konferenzbeitrag "IBEC 2003" UND SAE Technical Paper Series, Jan. 20, 2002, 48, vol. 1, Mar. 28, 2017, 6 pages, XP055518353.
Smith, Wm, A.P. et al., "Specular and Diffuse Reflectance in Microfacet Models", Image Processing (ICIP), 2009, 16th IEEE International Conference ON, IEEE, Piscataway, NJ, Nov. 7, 2009, pp. 3781-3784, XP031629009.
Hasewaga, H., "Evaluations of Lidar Reflectance Amplitude Sensitivity Towards Land Cover Conditions", Bulletin of the Geographical Survey Institute, Mar. 2006, vol. 53, pp. 43-50.
International Search Report and Written Opinion for International Application No. PCT/EP2021/051221, mailed Mar. 31, 2021, with partial English translation, 9 pages.
International Search Report and Written Opinion for International Application No. PCT/EP2021/051221, mailed Mar. 31, 2021, 13 pages (French).

* cited by examiner

METHOD FOR PROCESSING DATA PROVIDED BY A LIDAR AND ASSOCIATED COMPUTER

CROSS REFERENCE TO RELATED APPLICATIONS

This application is the U.S. National Phase Application of PCT International Application No. PCT/EP2021/051221, filed Jan. 20, 2021, which claims priority to French Patent Application No. 2000561, filed Jan. 21, 2020, the contents of such applications being incorporated by reference herein.

FIELD OF THE INVENTION

The present invention relates to the field of lidars, and more particularly to the processing of the measurements of distance and the intensity reflected by a surface provided by a lidar (an abbreviation for "Light Detection And Ranging" or "Laser Detection And Ranging").

BACKGROUND OF THE INVENTION

Lidars may be used to measure the travel time of a light pulse between its emission and its reception on a sensor of the lidar after reflection on a surface, and consequently to determine the distance between the lidar and the point on the surface in question. Lidars may also be used to measure the intensity reflected by a point on the surface in question, by means of a dedicated sensor. On the basis of these measurements of distance, it is possible to determine the reflectivity of the surface in question and the angle between the point on the surface in question and the ray of the light pulse.

The prior art comprises the document "Creating 3D Virtual Driving Environments for Simulation-Aided Development of Autonomous Driving and Active Safety", Arvind Jayaraman et al, UND SAE Technical Paper Series, Vol. 1, 28 Mar. 2017.

In a known manner, the reflected intensity Ir is composed of an ambient intensity Ia, a diffuse intensity Id and a specular intensity Is, as described in the document "Evaluations of lidar reflectance amplitude sensitivity towards land cover conditions", H. Hasegawa, Bulletin of the Geographical Survey Institute, Vol. 53, pp. 43-50, March 2006.

It has been found that the specular intensity is negligible when the angle of incidence differs from the normal to the surface, which is usually the case. Thus, given the value of the ambient light intensity Ia, the value of the diffused intensity Id may be calculated according to the following equation:

$$Id = Ir - Ia \quad [\text{Math. 1}]$$

It will be noted that the ambient light intensity Ia is constant for all the measurement points, while the diffuse intensity Id takes the following form:

$$Id = \frac{Rd\cos\theta}{d^2} \quad [\text{Math. 2}]$$

where Rd is the diffusion coefficient for the material forming the surface on which the light pulse is reflected, referred to as the reflectivity in the remainder of the present disclosure, θ is the angle of incidence of the light beam emitted by the lidar on the point on the surface in question, and d is the distance between the lidar and the point on the surface in question.

Thus it is possible to determine the ambient intensity Ia as the continuous component of the reflected intensity Ir measured by the sensor, and therefore to determine the diffuse intensity Id.

Then, given the angle of incidence θ and the distance d, the diffusion coefficient Rd, also called the reflectivity, can then be determined for the material of the surface in question.

It will be noted that the angle of incidence θ may be determined in a way known to those skilled in the art, by calculating the normal to the surface at the measurement point in question, given the angle of the beam emitted by the lidar. The orientation of the normal to the surface defined around the measurement point in question is found, for example, by using three-dimensional coordinates (x, y, z) of three measurement points defining a surface adjacent to the measurement point in question. It will be noted that the three-dimensional coordinates (x,y,z) of the measurement points are determined by using the distance d between the measurement point in question and the lidar and the angle of the beam reflected by the measurement point and received by the lidar.

The distanced d is determined by the lidar on the basis of the measurement of the time of flight, as explained previously.

The reflectivity may be used to discriminate or identify different surfaces, because reflectivity is a property of the material forming a surface. The data relating to the distance and the angle between the lidar and the point on the surface in question may be used to reconstitute the surface illuminated by the lidar.

In other applications, notably in the motor vehicle field, the data relating to reflectivity are used to identify or discriminate different surfaces when these surfaces are made of different materials. The distance associated with a surface has various applications, notably for vehicle monitoring or emergency braking.

Unfortunately, the data measured by lidar, namely the reflected intensity and the distance, are marred by measurement errors which affect the estimation of the angle and the reflectivity, and limit the precision of the various applications.

SUMMARY OF THE INVENTION

The present disclosure is intended to overcome the aforesaid problems.

One aspect of the present invention is to enable the distance and/or angle provided by lidar to be determined with greater precision.

One aspect of the present invention is to enable the reflectivity to be determined with greater precision.

What is proposed is a computer configured for:
obtaining, for a plurality of measurement points of a lidar, data representative of a diffuse intensity at a measurement point and a distance between the measurement point and the lidar,
determining the direction normal to the surface tangential to each measurement point, and deducing therefrom an angle of incidence of the lidar at each measurement point,
calculating, for each measurement point, the reflectivity from the angle of incidence, the distance and the diffuse intensity.

The computer is also configured for:
identifying spatially adjacent measurement points having a reflectivity within a given range of values centered on a common reflectivity value, in order to form common reflectivity zones,
defining a cost function for at least one common reflectivity zone, the cost function comprising a plurality of terms, each term being relative to a measurement point and comprising a first diffuse intensity obtained using the data representative of the diffuse intensity and a second diffuse intensity determined as a function of the common reflectivity value, the angle and the distance of the measurement point in question,
minimizing the cost function, using a non-linear optimization algorithm, in order to update at least one of the angle, the distance and the reflectivity at the measurement point, for each of the measurement points belonging to a common reflectivity zone.

According to another aspect, a motor vehicle is proposed, provided with a lidar and a computer as described above.

According to another aspect, a method for processing data provided by a lidar is proposed, the method being implemented by a computer and comprising the following steps:
obtaining, for a plurality of measurement points of a lidar, data representative of a diffuse intensity at a measurement point and a distance between the measurement point and the lidar,
determining the direction normal to the surface tangential to each measurement point, and deducing therefrom an angle of incidence of the lidar at each measurement point,
calculating, for each measurement point, the reflectivity from the angle of incidence, the distance and the diffuse intensity,
identifying spatially adjacent measurement points having a reflectivity within a given range of values centered on a common reflectivity value in order to form common reflectivity zones,
defining a cost function for at least one common reflectivity zone, the cost function comprising a plurality of terms, each term being relative to a measurement point and comprising a first diffuse intensity obtained using the data representative of the diffuse intensity and a second diffuse intensity determined as a function of the common reflectivity value, the angle and the distance of the measurement point in question,
minimizing the cost function, using a non-linear optimization algorithm, in order to update at least one of the angle, the distance and the reflectivity at the measurement point, for each of the measurement points belonging to a common reflectivity zone.

According to another aspect, a computer program is proposed, comprising instructions for implementing all or part of a method as defined in the present document when this program is executed by a computer.

According to another aspect, a non-transient computer-readable recording medium is proposed, on which medium a computer program as described above is recorded.

The features disclosed in the paragraphs below can optionally be implemented. They can be implemented independently of each other or in combination with each other:
the measurement points belonging to common reflectivity zones also have angles of incidence within a range of permitted values;
the diffuse intensity, the angle and the distance are linked by a diffuse intensity calculation function, and the second diffuse intensity is determined using said function;
the diffuse intensity calculation function is written in the form:

$$Id = \frac{Rd\cos\theta}{d^2} \quad [\text{Math. 2}]$$

where Id is the diffuse intensity, Rd is the reflectivity, θ is the angle of incidence and d is the distance;
the cost function is equal to the sum of the different terms relative to one measurement point;
the cost function fc, for a common reflectivity zone Rc in question, is written thus:

$$fc = \sum_{k=1}^{N}\left|Id_k - \frac{Rc\cos\theta_k}{d_k^2}\right| \quad [\text{Math. 3}]$$

where $Id_k$ is the diffuse intensity, $d_k$ is the distance and $\theta_k$ is the angle of incidence for a measurement point in question with the index k belonging to the common reflectivity zone in question, and N is the number of measurement points belonging to the common reflectivity zone in question.

Advantageously, the identification of a common reflectivity zone enables this common reflectivity value to be used for defining the cost function. The optimization makes it possible to determine at least one of the parameters chosen from among the angle of incidence, the reflectivity and the distance for each of the measurement points belonging to the common reflectivity zone. The use of the common reflectivity value in the cost function makes it possible to use a single value and thus eliminate uncertainties of measurement.

It will be noted that, depending on the intended applications, one or more of these parameters may be updated in order to improve their precision.

BRIEF DESCRIPTION OF THE DRAWINGS

Other features, details and advantages will become apparent from reading the following detailed description and from analyzing the appended drawings, in which.

DESCRIPTION OF THE EMBODIMENTS

The drawings and descriptions below essentially contain elements of definite character. Consequently they can be used not only to clarify the understanding of the present disclosure, but also to contribute to its definition if necessary.

Figure 1:
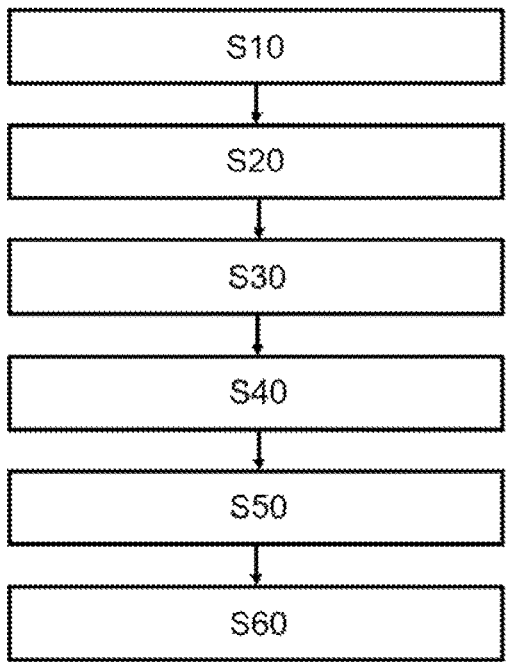
FIG. 1 shows different steps of a method for processing the data provided by a lidar according to one embodiment.

FIG. 1 shows different steps of a method for processing the data provided by a lidar, implemented by a computer, according to one embodiment.

The method comprises a step S10 of obtaining, for a plurality of measurement points of a lidar, data representative of a diffuse intensity Id at a measurement point and a distance d between the measurement point and the lidar.

As described above in the introductory section, the lidar measures the intensity Ir reflected by a measurement point located on a reflective surface, and the travel time of a light pulse reflected at the measurement point. On the basis of these measurement data, the computer of the lidar can determine the distance d between each measurement point and the lidar, together with the ambient intensity Ia, and the diffuse intensity Id, by subtracting the ambient intensity Ia from the reflected intensity Ir. Since the ambient light intensity Ia is constant for all the measurement points, it can be determined as the continuous component of the reflected intensity Ir measured by the lidar. The ambient intensity Ia is found in a known manner by acquiring the road scene, using the lidar, without illuminating it. The computer is also capable of determining the three-dimensional coordinates of each measurement point, on the basis of the distance d between each measurement point and the lidar and the value of the angle of the beam reflected by the measurement point and received by the lidar.

Depending on the method of processing the data produced by the lidar, the data representative of a diffuse intensity Id obtained by the computer may be the diffuse intensity Id, the reflected intensity Ir or, possibly, the ambient intensity Ia. Similarly, the data representative of the distance may be directly equal to the distance d determined by the lidar, the measured travel time, or the three-dimensional coordinates (x,y,z) of the measurement points determined by the lidar.

In one embodiment, the data representative of a diffuse intensity Id at a measurement point and a distance d between the measurement point and the lidar are received by the computer, if the computer implementing the method is separate from the computer of the lidar.

In another embodiment, the whole of the method described here is implemented by the computer of the lidar. The step of obtaining, S10, is then equivalent to the determination of the diffuse intensity Id and the distance d between the measurement point in question and the lidar.

In a particular embodiment, the data representative of a diffuse intensity Id and of a distance d between the measurement point and the lidar are obtained by receiving an image and a data structure.

The image comprises the measurement of the reflected intensity Ir for different measurement points, and the data structure comprises the three-dimensional coordinates (x,y,z) of each measurement point. The distance d between the measurement point having the three-dimensional coordinates (x,y,z) and the lidar is then determined by means of the following formula:

$$d = \sqrt{(x^2+y^2+z^2)}$$ [Math. 4]

Then, in a step S20, the computer determines the direction normal to the surface tangential to each measurement point, and deduces therefrom an angle of incidence θ of the lidar at each measurement point, given the direction of the light beam emitted by the lidar and guided toward the measurement point in question, as described above in the introductory section, for example.

In a step S30, the computer calculates, for each measurement point, the reflectivity $R_d$ from the angle of incidence θ determined in step S20, the distance d, and the diffuse intensity Id. As described above, the distance d and the diffuse intensity Id are either obtained directly by the computer in step S10 or determined from data obtained in a supplementary step if the computer implementing the method is different from that of the lidar.

In one embodiment, the reflectivity Rd is calculated by means of the following function for calculating the diffuse intensity:

$$Id = \frac{Rd\cos\theta}{d^2}$$ [Math. 2]

In another embodiment, the reflectivity Rd is calculated by means of the following function for calculating the diffuse intensity:

$$Id = \frac{Rd\sin\left(\theta + \frac{\pi}{2}\right)}{d^2}$$ [Math. 5]

where Rd is the reflectivity of the material forming the surface on which the light pulse is reflected, θ is the angle of incidence of the light beam emitted by the lidar onto the point on the surface in question, determined in step S20, and d is the distance between the lidar and the measurement point in question.

In a step S40, spatially adjacent measurement points having a reflectivity within a given range of values centered on a common reflectivity value Rc are identified in order to form common reflectivity zones.

Figure 2:
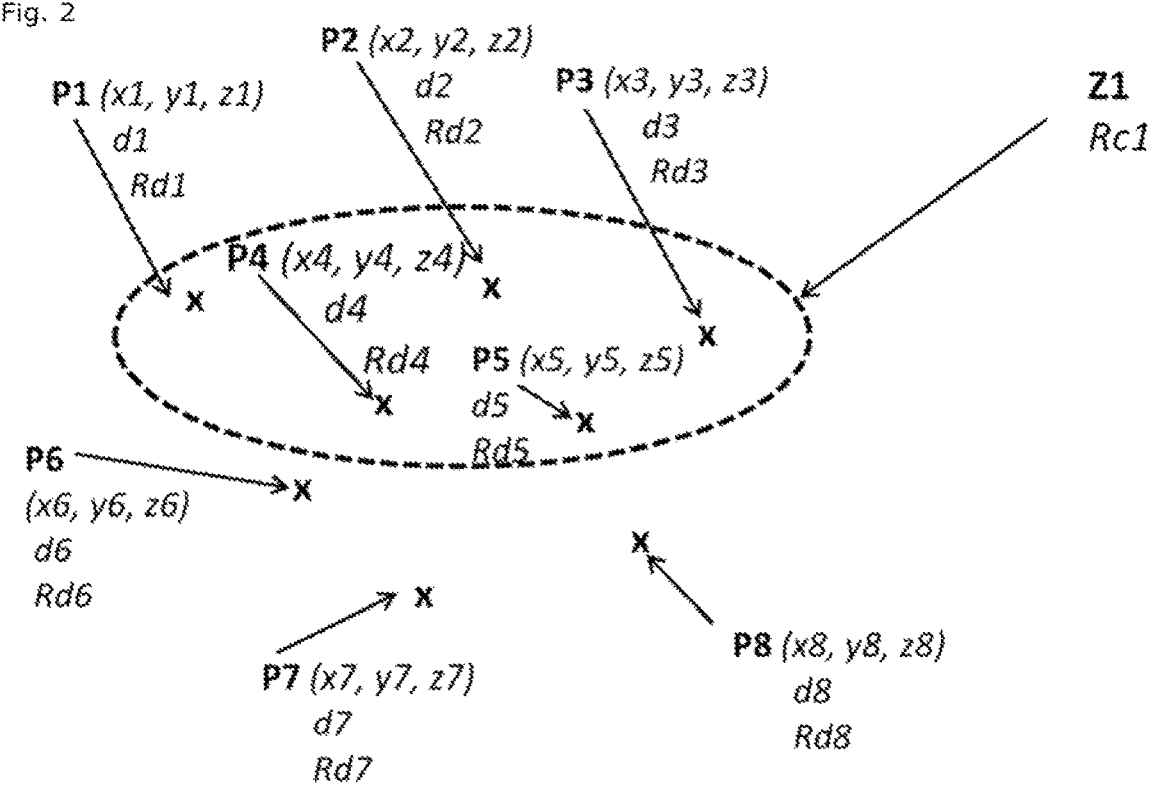
FIG. 2 is a schematic illustration of a common reflectivity zone.

An example of a common reflectivity zone is shown in FIG. 2. In this figure, measurement points P1, P2, P3, P4, P5, P6, P7, P8 have coordinates (x1, y1, z1), (x2, y2, z2), (x3, y3, z3), (x4, y4, z4), (x5, y5, z5), (x6, y6, z6), (x7, y7, z7), (x8, y8, z8), are located at a distance d1, d2, d3, d4, d5, d6, d7, d8 from the lidar and have a reflectivity of Rd1, Rd2, Rd3, Rd4, Rd5, Rd6, Rd7, Rd8, respectively.

As shown in FIG. 2, the measurement points P1, P2, P3, P4, P5 are spatially adjacent, taking into account their coordinates (x1, y1, z1), (x2, y2, z2), (x3, y3, z3), (x4, y4, z4), (x5, y5, z5). It will be noted that the distances d1, d2, d3, d4, d5 associated with these points are not taken into account, since points located at the same distance from the lidar are not necessarily spatially adjacent. It will be noted that the points P1, P2, P3, P4, P5 have a reflectivity of Rd1, Rd2, R3, Rd4 and Rd5, lying within the range of values Rc1±Δ, where, for example, Rc1 is a common reflectivity value and Δ is a predetermined value. In particular, the points P1, P2, P3, P4, P5 therefore belong to a zone Z1 having a common reflectivity Rc1.

In a step S50, a cost function is defined for at least one common reflectivity zone, for example the zone Z1. The cost function comprises a plurality of terms Tk. Each term is relative to a measurement point, in this case P1, P2, P3, P4, P5, and comprises a first diffuse intensity $Id_k$, in this case Id1, Id2, Id3, Id4, Id5, corresponding to the diffuse intensity determined from the reflected intensity Ir measured by the lidar and the ambient intensity Ia, and a second, theoretical, diffuse intensity determined by means of the diffuse intensity calculation function as defined above [Math. 2] or [Math. 5].

In particular, the value of the theoretical intensity is determined as a function of the common reflectivity value Rc, in this case Rc1, of the angle $\theta_k$ and the distance $d_k$ of the measurement point in question identified here by the index k, where k belongs to {1, . . . , 5} in the example of FIG. 2.

In one embodiment, $$Tk = \left| Id_k - \frac{Rc\cos\theta_k}{d_k^2} \right| \quad \text{[Math. 6]}$$

when the diffuse intensity calculation function [Math. 2] is used.

Thus, the value of reflectivity taken into account for each of the measurement points is not equal to the reflectivity $Rd_k$ calculated in step S30, but is equal to the reflectivity Rc for the common reflectivity zone in question.

In a particular embodiment, the cost function is equal to the sum of the different terms relative to a measurement point Tk, in this case P1, P2, P3, P4, P5.

Thus the cost function fc is written:

$$fc = \sum_{k=1}^{N} Tk \quad \text{[Math. 7]}$$

The index k is used to identify the measurement points belonging to the common reflectivity zone in question, and N is equal to the number of measurement points belonging to the common reflectivity zone in question.

In one embodiment, the cost function fc, when the function [Math. 2] is used, takes the form of:

$$fc = \sum_{k=1}^{N} \left| Id_k - \frac{Rc\cos\theta_k}{d_k^2} \right| \quad \text{[Math. 3]}$$

In the example considered here, for the zone Z1, Rc=Rc1 and N=5.

In step S60, the cost function fc is minimized, using an iterative non-linear optimization algorithm, in order to update at least one of the angle $\theta_k$, the distance $d_k$ and the reflectivity $Rd_k$ at the measurement point, for each of the measurement points Pk belonging to a common reflectivity zone, in this case the measurement points P1, P2, P3, P4, P5 having a common reflectivity Rc1.

It will be noted that, when the reflectivity $Rd_k$ is optimized, the initial value, at the start of the optimization, is the common reflectivity Rc, but that this value is updated during the optimization. If the reflectivity is not optimized, the value Rc remains unchanged.

Consequently, on completion of step S60, we obtain updated, and therefore more precise, values of the angle of incidence $\theta_k$, the distance $d_k$ and/or the reflectivity $Rd_k$ for each of the measurement points Pk considered.

In one embodiment, the measurement points belonging to common reflectivity zones also have angles of incidence within a range of permitted values.

This range of permitted values may be used to constrain the values of the angle of incidence used by the iterative non-linear optimization algorithm. The non-linear optimization algorithm thus converges more rapidly.

Figure 3:
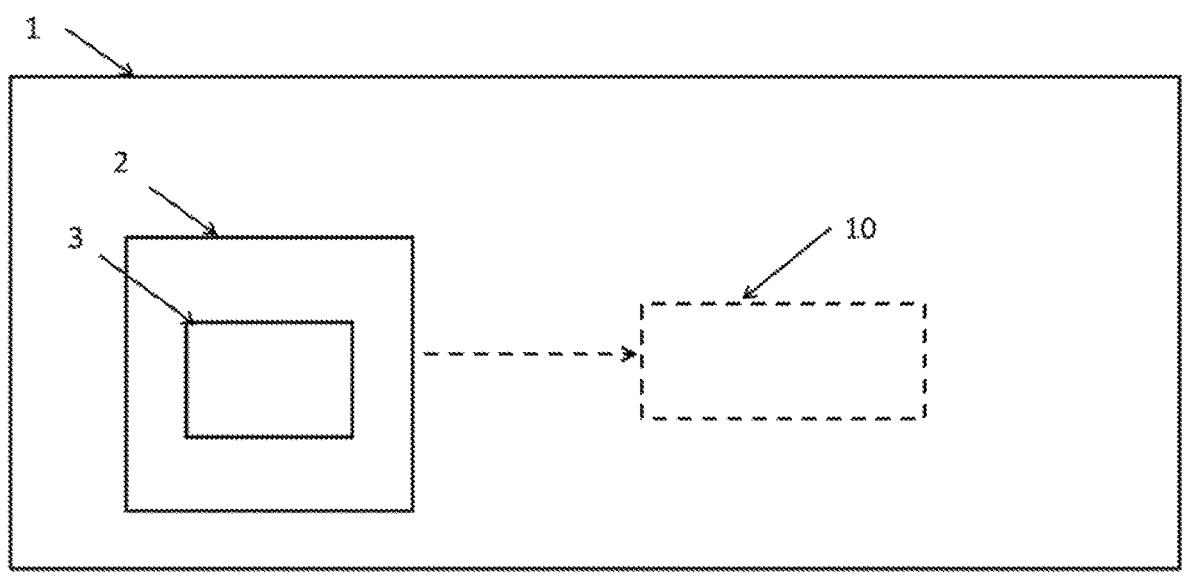
FIG. 3 shows an example of implementation of the method for processing the data provided by a lidar according to one embodiment.

FIG. 3 shows schematically a motor vehicle 1 comprising a lidar 2. As discussed above, the lidar 2 is configured for emitting a light beam comprising a light pulse and for measuring the time of flight and therefore the distance between a measurement point and the lidar, together with the intensity reflected by the measurement point, using a suitable sensor. The lidar 2 therefore comprises a computer 3 configured for processing the data supplied by the sensor and for controlling the light beam so as to determine the distance d and the reflected intensity Ir, or even the ambient intensity Ia and the diffuse intensity Id, for each of the measurement points. The computer 3 is also configured for determining the angle of the beam reflected by the measurement point and received by the lidar for each measurement point, and for determining the three-dimensional coordinates of the measurement points.

In one embodiment, the method described with reference to FIG. 1 is implemented by the computer 3 of the lidar 2. Thus, in step S10, the data representative of the diffuse intensity Id at the measurement point and of the distance d between the measurement point and the lidar are determined by the computer 3, and stored in memory for use in the implementation of steps S20 to S60. The three-dimensional coordinates (x,y,z) of each measurement point are also determined by the computer 3, and are stored in memory for re-use in the implementation of the method.

In one embodiment, shown in broken lines in FIG. 3, the method described with reference to FIG. 1 is implemented by a computer 10 different from the computer 3 present in the lidar. In this case, in step S10, the data representative of the diffuse intensity Id at the measurement point and of the distance d between the measurement point and the lidar, determined by the computer 3 for a plurality of measurement points of the lidar, are transmitted to the computer 10. In a preferred embodiment, the intensity Ir measured for each measurement point by the sensor, together with the three-dimensional coordinates of the corresponding measurement points, are then transmitted to the computer 10.

INDUSTRIAL APPLICATION

The data supplied by lidars are used in many applications, notably in the fields of motor vehicles and aerial imaging. In motor vehicle field, these data may be used for the identification of different types of object on the basis of the reflectivity, and, if appropriate, of the angle of incidence, as well as their distance, by driving assistance systems commonly referred to as ADAS ("Advanced Driver Assistance Systems"). This is particularly useful for applications such as emergency braking, vehicle monitoring or line change detection, for example.

The present disclosure is not limited to the various embodiments described above purely by way of example, but incorporates all variants that may be envisaged by those skilled in the art in the desired scope of protection.

The invention claimed is:

1. A computer configured for:
   obtaining, by a lidar of a motor vehicle, for a plurality of measurement points located on a surface of an object, data representative of a diffuse intensity at a measurement point and of a distance between the measurement point and the lidar;
   determining the direction normal to the surface tangential to each measurement point, and deducing therefrom an angle of incidence of the lidar at each measurement point;
   calculating, for each measurement point, a reflectivity from the angle of incidence, the distance, and the diffuse intensity;
   identifying spatially adjacent measurement points having a corresponding reflectivity within a given range of values centered on a common reflectivity value, in order to form common reflectivity zones;

defining a cost function for at least one common reflectivity zone, the cost function comprising a plurality of terms, each term being relative to a measurement point and comprising a first diffuse intensity obtained using the data representative of the diffuse intensity and a second diffuse intensity determined as a function of the common reflectivity value, the angle of incidence, and the distance of the measurement point in question;

minimizing the cost function, using an iterative non-linear optimization algorithm, in order to update at least one of the angle of incidence, the distance, and the reflectivity at the measurement point, for each of the measurement points belonging to a common reflectivity zone;

identifying objects based on the updated at least one of the angle of incidence, the distance, and the reflectivity at the measurement point, for each of the measurement points belonging to the common reflectivity zone; and using the identified objects in at least one of emergency braking or line change detection of an Advanced Driver Assistance System ("ADAS") of the motor vehicle comprising the lidar.

2. The computer as claimed in claim 1, wherein the measurement points belonging to common reflectivity zones also have angles of incidence within a range of permitted values.

3. The computer as claimed in claim 1, wherein the diffuse intensity, the angle of incidence, and the distance are linked by a diffuse intensity calculation function, and the second diffuse intensity is determined using said function.

4. The computer as claimed in claim 3, wherein the diffuse intensity calculation function is written in the form:

$$Id = \frac{Rd\cos\theta}{d^2} \qquad \text{[Math. 2]}$$

where Id is the diffuse intensity, Rd is the reflectivity, θ is the angle of incidence and d is the distance.

5. The computer as claimed in claim 4, wherein the cost function fc, for a common reflectivity zone Rc in question, is written thus:

$$fc = \sum_{k=1}^{N} \left| Id_k - \frac{Rc\cos\theta_k}{d_k^2} \right| \qquad \text{[Math. 3]}$$

where $Id_k$ is the diffuse intensity, $d_k$ is the distance and $\theta_k$ is the angle of incidence for a measurement point in question with the index k belonging to the common reflectivity zone in question, and N is the number of measurement points belonging to the common reflectivity zone in question.

6. The computer as claimed in claim 1, wherein the cost function is equal to the sum of the different terms relative to a measurement point.

7. The computer as claimed in claim 6, wherein the cost function fc, for a common reflectivity zone Rc in question, is written thus:

$$fc = \sum_{k=1}^{N} \left| Id_k - \frac{Rc\cos\theta_k}{d_k^2} \right| \qquad \text{[Math. 3]}$$

where $Id_k$ is the diffuse intensity, $d_k$ is the distance and $\theta_k$ is the angle of incidence for a measurement point in question with the index k belonging to the common reflectivity zone in question, and N is the number of measurement points belonging to the common reflectivity zone in question.

8. A motor vehicle provided with the lidar and the computer as claimed in claim 1.

9. A method for processing data provided by a lidar, the method being implemented by a computer and comprising:

obtaining, by a lidar of a motor vehicle, for a plurality of measurement points located on a surface of an object, data representative of a diffuse intensity at a measurement point and of a distance between the measurement point and the lidar;

determining the direction normal to the surface tangential to each measurement point, and deducing therefrom an angle of incidence of the lidar at each measurement point;

calculating, for each measurement point, a reflectivity from the angle of incidence, the distance, and the diffuse intensity;

identifying spatially adjacent measurement points having a corresponding reflectivity within a given range of values centered on a common reflectivity value, in order to form common reflectivity zones;

defining a cost function for at least one common reflectivity zone, the cost function comprising a plurality of terms, each term being relative to a measurement point and comprising a first diffuse intensity obtained using the data representative of the diffuse intensity and a second diffuse intensity determined as a function of the common reflectivity value, the angle of incidence, and the distance of the measurement point in question;

minimizing the cost function, using an iterative non-linear optimization algorithm, in order to update at least one of the angle of incidence, the distance, and the reflectivity at the measurement point, for each of the measurement points belonging to a common reflectivity zone;

identifying objects based on the updated at least one of the angle of incidence, the distance, and the reflectivity at the measurement point, for each of the measurement points belonging to the common reflectivity zone; and using the identified objects in at least one of emergency braking or line change detection of an Advanced Driver Assistance System ("ADAS") of the motor vehicle comprising the lidar.

10. The method as claimed in claim 9, wherein the measurement points belonging to common reflectivity zones also have angles of incidence within a range of permitted values.

11. The method as claimed in claim 9, wherein the diffuse intensity, the angle of incidence, and the distance are linked by a diffuse intensity calculation function, and the second diffuse intensity is determined using said function.

12. The method as claimed in claim 9, wherein the diffuse intensity calculation function is written in the form:

$$Id = \frac{Rd\cos\theta}{d^2} \qquad \text{[Math. 2]}$$

where Id is the diffuse intensity, Rd is the reflectivity, θ is the angle of incidence and d is the distance.

13. The method as claimed in claim 9, wherein the cost function is equal to the sum of the different terms relative to a measurement point.

14. The method as claimed in claim 13, wherein the cost function fc, for a common reflectivity zone Rc in question, is written thus:

$$fc = \sum_{k=1}^{N}\left|Id_k - \frac{Rc\cos\theta_k}{d_k^2}\right|$$ [Math. 3]

where $Id_k$ is the diffuse intensity and $\theta_k$ is the angle of incidence for a measurement point in question with the index k belonging to the common reflectivity zone in question, and N is the number of measurement points belonging to the common reflectivity zone in question.

15. A non-transitory computer-readable recording medium containing a computer program stored therein for causing a computer processor to perform the method according to claim 9.

\* \* \* \* \*